(12) United States Patent
Kim

(10) Patent No.: US 8,031,772 B2
(45) Date of Patent: Oct. 4, 2011

(54) PARALLEL PROCESSING ARCHITECTURE FOR VIDEO DECOMPRESSION

(75) Inventor: Sang Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1482 days.

(21) Appl. No.: 11/274,289

(22) Filed: Nov. 16, 2005

(65) Prior Publication Data
US 2006/0104364 A1 May 18, 2006

(30) Foreign Application Priority Data
Nov. 17, 2004 (KR) .................. 10-2004-0093975

(51) Int. Cl.
H04N 7/12 (2006.01)
G06K 9/36 (2006.01)

(52) U.S. Cl. .................. 375/240.12; 382/234; 382/236; 382/238; 712/36

(58) Field of Classification Search .................. None
See application file for complete search history.

(56) References Cited

U.S. PATENT DOCUMENTS

| | | | | |
|---|---|---|---|---|
| 4,742,493 A * | 5/1988 | Lewallen et al. | ......... | 365/233.5 |
| 4,750,202 A * | 6/1988 | Feldman et al. | ............. | 379/335 |
| 5,226,125 A * | 7/1993 | Balmer et al. | ................ | 710/317 |
| 5,487,146 A * | 1/1996 | Guttag et al. | ................ | 345/519 |
| 7,140,016 B2 * | 11/2006 | Milovanovic et al. | ........ | 718/100 |
| 7,181,070 B2 * | 2/2007 | Petrescu et al. | ............ | 382/236 |
| 2002/0093852 A1* | 7/2002 | Kimura et al. | ........... | 365/189.01 |
| 2003/0051050 A1* | 3/2003 | Adelaide et al. | ............. | 709/238 |
| 2003/0185306 A1* | 10/2003 | MacInnis et al. | ........ | 375/240.25 |

FOREIGN PATENT DOCUMENTS

| | | |
|---|---|---|
| CN | 1150847 A | 5/1997 |
| CN | 1226036 A | 8/1999 |
| CN | 1394432 A | 1/2003 |
| KR | 102001000141 A | 1/2001 |
| KR | 102003005392 A | 2/2003 |

* cited by examiner

*Primary Examiner* — Bhavesh Mehta
*Assistant Examiner* — Barry Drennan
(74) *Attorney, Agent, or Firm* — Birch, Stewart, Kolasch & Birch, LLP

(57) ABSTRACT

Disclosed herein is a video decoding system of a mobile broadcasting receiver. The video decoding system of a mobile broadcasting receiver for decoding a compression-coded video signal includes: at least one buffer memory for performing video decoding; a plurality of coprocessors including a data processing unit partitioned into one or more hardware blocks, wherein the data processing unit performs actual video decoding via data input/output from/to the buffer memory; and a DMA (Direct Memory Access) coprocessor for performing a direct access operation to an external memory, wherein, the at least one buffer memory, the plurality of coprocessors and the DMA coprocessor take the form of hardware, and operations thereof are controlled via software in a processor.

16 Claims, 3 Drawing Sheets

PARALLEL PROCESSING ARCHITECTURE FOR VIDEO DECOMPRESSION

This application claims the benefit of Korean Patent Application No. 10-2004-0093975, filed on Nov. 17, 2004, which is hereby incorporated by reference as if fully set forth herein.

BACKGROUND OF THE INVENTION

1. Field of the Invention

The present invention relates to a mobile broadcasting receiver, and more particularly to a video decoding system of a mobile broadcasting receiver.

2. Discussion of the Related Art

Recently, operations of multimedia-related chips are processed by software (S/W) using a processor such as a Digital Signal Processor (DSP) with the increasing development of high-integration technology. As compared with hardware (H/W) processing, S/W processing has advantages in that Time-to-Market is fast, debugging is easy, and also Revision time and cost is low. Meanwhile, a video decoder standard of a Digital Multimedia Broadcasting (DMB) receiver among mobile broadcasting receivers is an H.264 standard which has received a great deal of attention recently.

The H.264 standard as the next generation MPEG-4 standard technology is generally referred to as Advanced Video Coding (AVC) (also called MPEG-4 Part 10 or MPEG-4 AVC). In addition, the H.264 standard relates to a compression method applied to the mobile broadcasting receiver such as the DMB, etc., or to the next generation DVD.

Herein, since the DMB receiver is a system for receiving and displaying the broadcasting while the receiver is in motion, the DMB receiver requires low power consumption. In a case where the H.264 video decoder employs only the above S/W design, since it requires a high clock frequency, power consumption is higher. Even though an entire H.264 algorithm adopts only the hardware design, it has disadvantages in that it has low flexibility, increases design time, requires difficult debugging, and is expensive to Revision, etc.

When the H.264 algorithm is employed in the H/W design and the S/W design, advantages and disadvantages thereof are shown in the table below.

|  | Advantages | Disadvantages |
| --- | --- | --- |
| H/W design of H.264 decoding | Low Clock Frequency Low Power Consumption | Hard Implementation Increased Design Time Difficult to Debug Expensive to Revision Low Flexibility Difficult to extend Design |
| S/W design of H.264 decoding | Easy Implementation Fast Time-to-Market Easy Debugging Easy Revision High Flexibility Easy to extend Design | High Clock Frequency High Power Consumption |

SUMMARY OF THE INVENTION

Accordingly, the present invention is directed to a video decoding system of a mobile broadcasting receiver that substantially obviate one or more problems due to limitations and disadvantages of the related art.

An object of the present invention is to provide a video decoding system of a mobile broadcasting receiver, wherein, since an H.264 video decoder is divided into an S/W processor and an H/W coprocessor, when performing video decoding, it is capable of having high flexibility, low power consumption, high performance and easy extensibility, and also it is easily designed and debugged.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video decoding system of a mobile broadcasting receiver for decoding a compression-coded video signal includes: at least one buffer memory for performing video decoding; a plurality of coprocessors including a data processing unit partitioned into one or more hardware blocks, wherein the data processing unit performs actual video decoding via data input/output from/to the buffer memory; and a DMA (Direct Memory Access) coprocessor for performing a direct access operation to an external memory, wherein, the at least one buffer memory, the plurality of coprocessors and the DMA coprocessor take the form of hardware, and operations thereof are controlled via software in a processor.

Preferably, the video decoding system further includes a plurality of input/output switches for connecting the buffer memory and the coprocessor, which are connected to input/output terminals of the buffer memory, wherein switching of the input/output switches is controlled via the software of the processor.

Preferably, the processor takes the form of software, and controls operations of each buffer memory, each coprocessor, each input/output switch and the DMA coprocessor via a bus.

Preferably, the plurality of coprocessors share the at least one buffer memory.

Preferably, the plurality of coprocessors are connected to form a common bus structure, and each input/output data interface of the plurality of coprocessors is formed as each read/write interface of the buffer memories, such that the buffer memories are separated from the plurality of coprocessors.

Preferably, a zero signal line is further arranged in the common bus structure, which disables read/write control signals so as to protect data stored in any buffer memory disconnected from the plurality of coprocessors.

In another aspect of the present invention, a video decoding system of a mobile broadcasting receiver for decoding a compression-coded video signal includes: at least one buffer memory for performing video decoding; a plurality of coprocessors partitioned into hardware blocks for performing at least de-blocking filtering, intra prediction, inter prediction and residual image decoding via data input/output from/to the at least one buffer memory; a plurality of input/output switches for connecting the buffer memory and the coprocessor, which are connected to an input/output terminals of the at least one buffer memory; and a DMA (Direct Memory Access) coprocessor for performing a direct access operation to an external memory, wherein, the at least one buffer memory, the plurality of coprocessors, the plurality of input/output switch and the DMA coprocessor take the form of hardware, and wherein, operation control of the plurality of coprocessors of the DMA coprocessor, and switching control of the plurality of input/output switches for data input/output from/to the at least one buffer memory and the plurality of coprocessors are performed via software in a processor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

In order to implement an H.264 video decoding algorithm, the present invention employs coprocessors which are partitioned into hardware blocks, wherein the hardware blocks correspond to simple data-processing units, which require a number of operations, such as a residual image decoding unit, a de-blocking filtering unit, an intra prediction unit and an inter prediction unit. In addition, operations of the coprocessors are controlled via software partitioned into a plurality of control programs.

Figure 1:
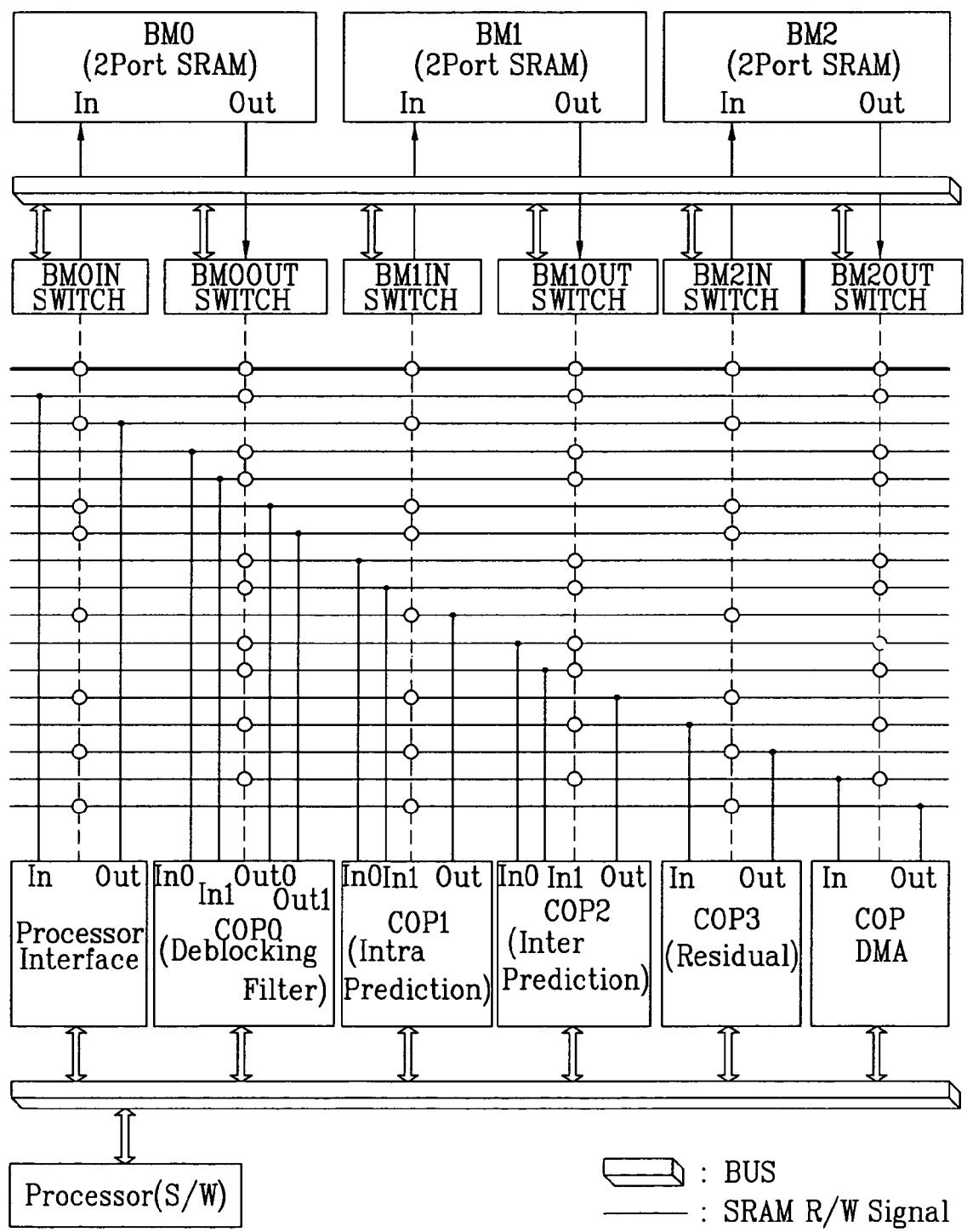
FIG. 1 is a block diagram showing the configuration of a video decoding system of a mobile broadcasting receiver according to an embodiment of the present invention.

FIG. 1 is a block diagram showing the configuration of a video decoding system of a mobile broadcasting receiver according to an embodiment of the present invention.

Referring to FIG. 1, the video decoding system of the mobile broadcasting receiver includes a plurality of buffer memories (BM0~BM2), a plurality of coprocessors (COP0~COP3), a plurality of input/output switches, a Direct Memory Access (DMA) coprocessor (COPDMA) and a processor. Herein, the buffer memory, the coprocessor and the input/output switch take the form of hardware, and a switching operation of the input/output switch for connecting the buffer memory and the coprocessor is controlled via software of the processor. That is, the processor is software, and control commands are transmitted to a bus through a processor interface. The processor interface serves as a bridge between the buffer memory and the bus, and causes the processor to read or write data in the buffer memory.

In addition, elements of the coprocessors are connected to a common bus structure, and input/output data interfaces of the coprocessors adopt a Static Random Access Memory (SRAM) read/write interface. Thereby, the elements of the coprocessors are isolated from data interfaces.

In addition, the coprocessors share the plurality of buffer memories (BM0~BM2). Herein, the buffer memories (BM0~BM2) serve to store data to be processed by the coprocessor or data pre-processed by the coprocessor. An embodiment of the present invention employs 2-port SRAM as the buffer memory.

Herein, each input/output switch is arranged at a read/write port of each buffer memory (BM0~BM2) in order to dynamically switch the shared buffer memories (BM0~BM2) to the coprocessor. That is, each input switch is switched on/off under control of the software in the corresponding processor so as to select the processor for writing data to the corresponding buffer memory among the plurality of coprocessors, and each output switch is switched on/off under control of the software of the processor so as to select the corresponding processor for reading data from the corresponding buffer memory among the plurality of coprocessors. At this time, the buffer memories disconnected to any of the plurality of coprocessors must disable read/write control signals so as to protect data stored therein. A signal line for disabling read/write control signals is a zero signal line.

In other words, the software of the processor dynamically controls operations of the coprocessors including the DMA coprocessor via the bus, and controls switching to a required buffer memory among the plurality of internal buffer memories. Herein, no signal is present between the coprocessors except for the above signals. That is, the bus only causes the processor to control the H/W elements, or the plurality of coprocessors.

According to an embodiment of the present invention, a first coprocessor (COP0) performs the blocking filtering operation, a second coprocessor (COP1) performs the intra prediction operation, a third coprocessor (COP2) performs the inter prediction operation, and a fourth coprocessor (COP3) performs the residual image decoding operation, wherein, these coprocessors take the form of hardware.

In addition, since the number of the coprocessors and the H/W structures in each coprocessor may be different according to intention of a system designer, there is no limit to the above description made in conjunction with embodiments of the present invention.

In addition, the DMA coprocessor (COPDMA) takes the form of H/W so as to perform a DMA function which is used to load/store input/output data of the buffer memory from the external memory.

Figure 2:
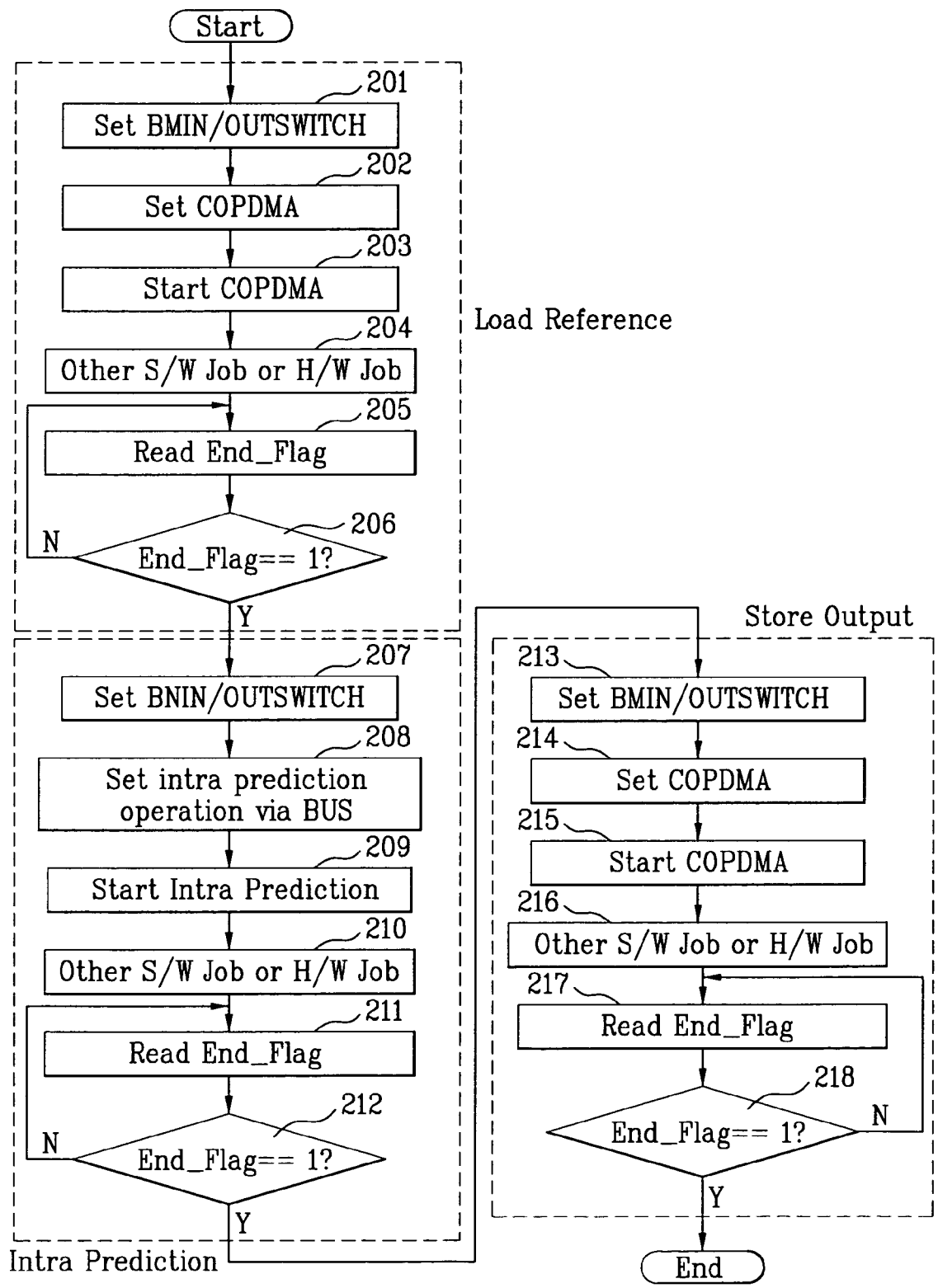
FIG. 2 is a flow chart illustrating a process for controlling an operation of an intra prediction block via bus using S/W in a processor of FIG. 1.

FIG. 2 is a flow chart illustrating a process for controlling an intra prediction operation of the second coprocessor (COP1) via the bus using S/W of the processor of FIG. 1.

To begin with, the intra prediction operation may be divided into three processes. That is, the intra prediction operation may include a process (steps 201 to 206) for loading the reference data required for the intra prediction from the external memory, and storing the loaded reference data in the buffer memory, a process (steps 207 to 212) for reading the residual image data and reference image data from the external memory, performing the intra prediction, and storing the resulting data in the buffer memory, and a process (steps 213 to 218) for loading the intra predicted data from the buffer memory, and storing the loaded data in the external memory.

In step 201, the processor connects the DMA coprocessor and the buffer memory by controlling the switching of the input/output switch via the bus using the software, wherein the DMA coprocessor reads the reference data required for intra prediction from the external memory, and the buffer memory stores the read reference data. After performing step 210, a connection state of a buffer memory is as shown in FIG. 3.

Figure 3:
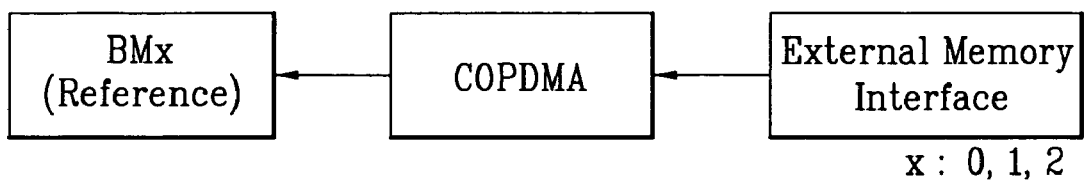
FIG. 3 is a view illustrating a connection state of a buffer memory, a DMA coprocessor and an external memory for loading reference data in FIG. 2.

FIG. 3 is a view illustrating a connection state of a buffer memory, a DMA coprocessor and an external memory for loading reference data in FIG. 2. Referring to FIG. 3, the DMA coprocessor (COPDMA) is connected to external memory interface, and a buffer memory (BMx) for storing the reference data is connected to the DMA coprocessor (COPDMA).

In step 202, the processor controls the DMA coprocessor (COPDMA) via the bus so as to load the reference data of a reference frame from the external memory. Next, the processor applies a load start command to the DMA coprocessor (COPDMA) via the bus (Step 203)

Then, the DMA coprocessor (COPDMA) reads the reference data from the external memory, and stores the reference data in the corresponding buffer memory (BMx) which is connected according to Step 201. At this time, the processor according to the present invention does not discard clock frequency which is used when loading all reference data from the external memory, but operates other coprocessors or performs other S/W operations (Step 204). Herein, this process is controlled via the S/W of the processor.

Thus, the video decoding system according to the present invention is capable of flexibly interconnecting hardware or connecting hardware and software in a form of a pipeline through the above Step 204, and thereby it is possible to increase performance of the H.264 video decoder.

Next, in order to determine whether the reference frame is completely loaded, the processor reads an end flag (End_Flag) (Step 205), and determines whether a value of the End_Flag is '1' (Step 206). That is, if the reference frame is completely loaded, the value of the End_Flag is set to '1', and if not, the value of the End_Flag is reset to '0'. When the value of the End_Flag is not '1', that is, when it is determined that the reference frame is not completely loaded, it returns to Step 205 so as to continuously perform the above reference frame load process. When the value of the End_Flag is '1', that is, when it is determined that the reference frame is completely loaded, it proceeds to Step 207 so as to perform the actual intra prediction.

At this time, when performing the intra prediction, the processor takes the form of a composition of a pre-calculated residual image and a reference image according to the reference data. That is, since the residual image is compression-coded data, the processor performs intra prediction using the residual image and the reference image. Herein, the residual image and the reference image must be stored in the buffer memory.

For example, if the residual image is an intra macro block, since the residual image is an image which is compression-coded via Discrete Cosine Transform (DCT), quantization and Variable Length Coding (VLC), the residual image must be restored to original data through the intra prediction.

Figure 4:
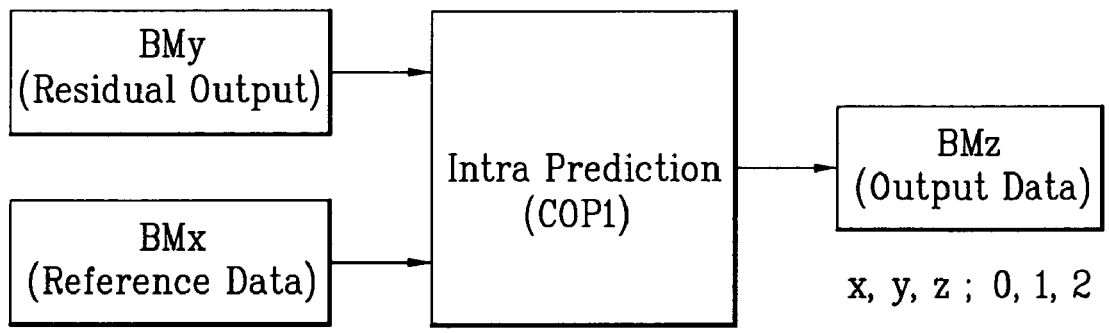
FIG. 4 is a view illustrating a connection state of buffer memories and an intra prediction block for performing actual intra prediction in FIG. 2.

That is, in Step 207, the processor connects the buffer memory (BMx) in which reference image data are stored and a buffer memory (BMy) in which residual image data are stored, to an input terminal of the second coprocessor (COP1) by controlling the switching of the input/output switch via the bus using the software. In addition, the processor connects a buffer memory (BMz) in which the intra predicted data are stored, to an output terminal of the second coprocessor (COP1). Next, by performing Step 207, a dedicated buffer memory (i.e. SRAM) is seemingly connected to the input terminal and output terminal of an intra prediction block, that is, the second coprocessor (COP1). FIG. 4 is a view illustrating a connection state of buffer memories and an intra prediction block for performing actual intra prediction in FIG. 2.

In the above Step 207, the input/output connection between the buffer memories and the second coprocessor (COP1) is performed via the corresponding input/output switch under control of the processor, and then, in Step 208, the processor sets a mode of the intra prediction and a control value required for the intra prediction in an internal register of the second coprocessor (COP1), and applies a prediction start command to the second coprocessor (COP1) via the bus.

Then, the second coprocessor (COP1) performs the intra prediction using the residual image and the reference image, wherein the intra prediction is performed by internal hardware of the second coprocessor (COP1) (Step 209). Next, the intra predicted data is stored in the buffer memory (BMz) which is connected to the output terminal of the second coprocessor (COP1) through Step 207.

Referring to FIG. 4, the residual image data are stored in the buffer memory (BMy), and the reference image data are stored in the buffer memory (BMx). In addition, the residual image data and the reference image data outputted from the buffer memories (BMy, BMx) are inputted to the intra prediction block, or the second coprocessor (COP1). The data intra-predicted by the second coprocessor (COP1) is stored in the buffer memory (BMz).

In Step 210, as in Step 204, the processor does not discard clock frequency which is used when storing the intra predicted data in the buffer memory, but operates other coprocessors or performs other S/W operations (Step 204). Herein, this process is controlled via the S/W of the processor. Thus, the video decoding system is capable of flexibly interconnecting hardware or connecting hardware and software in a form of a pipeline through the above Step 204, and thereby it is possible to increase performance of the H.264 video decoder.

Then, in order to determine whether intra prediction is completed, the processor reads an end flag (End_Flag) (Step 211), and determines whether a value of the End_Flag is '1' (Step 212). Similarly, if the intra prediction is completed, the value of the End_Flag is set to '1', and if not, the value of the End_Flag is reset to '0'. When the value of the End_Flag is not '1', that is, when it is determined that the intra prediction is not completed, it returns to Step 211 so as to continuously perform the above intra prediction process. When the value of the End_Flag is '1', that is, when it is determined that the intra prediction is completed, it proceeds to Step 213 so as to load the intra predicted data stored in the buffer memory (BMz) and to store the loaded data in the external memory.

Figure 5:
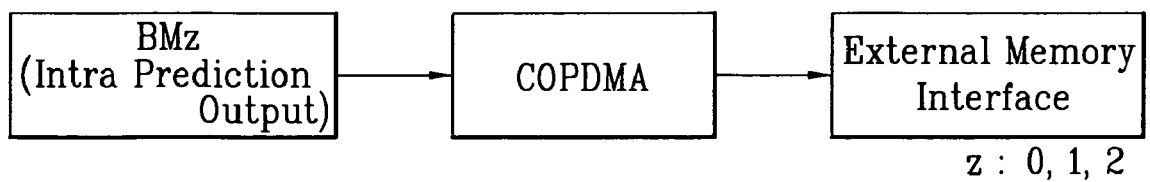
FIG. 5 is a view illustrating a connection state of a buffer memory, a DMA coprocessor and an external memory for storing predicted data in an external memory in FIG. 2.

That is, in Step 213, the processor connects the buffer memory (BMz) in which the intra predicted data are stored to an input terminal of the DMA coprocessor (COPDMA). FIG. 5 is a view illustrating a connection state of a buffer memory, a DMA coprocessor and an external memory for storing predicted data in an external memory in FIG. 2. That is, the processor connects an output terminal of the buffer memory (BMz) in which the intra predicted data are stored, to the DMA coprocessor (COPDMA), and connects an output terminal of the DMA coprocessor (COPDMA) to the external memory interface, by controlling the switching of the input/output switch via the bus using the software.

Then, the processor controls the DMA coprocessor (COPDMA) via the bus so as to load the intra predicted data from the buffer memory (BMz) and to store the loaded data in a required position of the external memory (Step 214), and applies a store start command to the DMA coprocessor (COPDMA) (Step 215). Next, the DMA coprocessor (COPDMA) reads the intra predicted data from the buffer memory (BMz), and stores the loaded data in the required position of the external memory.

Similarly, the processor does not discard clock frequency which is used when storing the intra predicted data in the external memory, but operates other coprocessors or performs other S/W operations (Step 216). Herein, this process is controlled via the S/W of the processor. Thus, the video decoding system is capable of flexibly interconnecting hardware or connecting hardware and software in a form of a pipeline through the above Step 204, and thereby it is possible to increase performance of the H.264 video decoder.

Then, in order to determine whether the intra predicted data are completely stored in the external memory, the processor reads an end flag (End_Flag) (Step 217), and determines whether a value of the End_Flag is '1' (Step 218). Similarly, if the intra predicted data are completely stored in the external memory, the value of the End_Flag is set to '1', and if not, the value of the End_Flag is reset to '0'. When the value of the End_Flag is not '1', that is, when it is determined that the intra predicted data are completely stored in the external memory, it returns to Step 217 so as to continuously perform the above intra predicted data storage process. When the value of the End_Flag is '1', that is, when it is determined that the intra predicted data are completely stored in the external memory, the intra predicted data storage process is ended.

The intra prediction process has been described, and also operations of other coprocessors, for example, coprocessors for performing the de-blocking filtering, the inter prediction and the residual image decoding may be performed under control of the S/W of the processor as shown in FIG. 2.

As apparent from the above description, the present invention provides a video decoding system of a mobile broadcasting receiver, wherein, by partitioning operation units having the amount of operations into hardware coprocessors, and controlling the operations of the coprocessors via software, it is possible to decrease clock frequency and power consumption.

In addition, by flexibly interconnecting or connecting hardware and software in a form of a pipeline, it is possible to decrease clock frequency, thereby increasing performance of the video decoder. In addition, by connecting each coprocessor to a bus structure and a common SRAM interface, it is possible to isolate the coprocessors and the buffer memories, thereby enabling easy design of the video decoding system and decreasing design time of the video decoding system.

In addition, it is possible to easily debug elements of the coprocessors in the video decoding system, and to easily add or subtract new coprocessors. In addition, by controlling detailed operations of the coprocessors via software, and performing other algorithms except for data processing operation via software, it is possible to increase flexibility of the video decoding system, thereby decreasing Revision time and cost of the video decoding system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video decoding system for decoding a compression-coded video signal, the video decoding system comprising:
at least one buffer memory configured to store reference image data and residual image data required for an intra prediction process used during decoding of the compression-coded video signal, wherein the residual image data is stored in a first buffer memory of the at least one buffer memory and the reference image data is stored in a second buffer memory of the at least one buffer memory;
a plurality of coprocessors configured to perform at least the intra prediction process using the reference image data and the residual image data, and to store a resulting intra predicted data in the at least one buffer memory, wherein the plurality of coprocessors are coupled to the at least one buffer memory;
a DMA (Direct Memory Access) coprocessor configured to perform a direct access operation to an external memory to load the reference image data from the external memory, and to store the reference image data in the at least one buffer memory, wherein, the at least one buffer memory, the plurality of coprocessors and the DMA coprocessor take the form of hardware, and
a processor interface configured to receive operational commands from a software implementation of a processor, wherein the processor transmits the operational commands to the processor interface through a processor interface bus to control the plurality of coprocessors to perform the intra prediction process using the reference image data and the residual image data, to control the DMA coprocessor to load the reference image data from the external memory, and to store the reference image data in the at least one buffer memory.

2. The video decoding system as set forth in claim 1, further comprising a plurality of input/output switches configured to connect a read port interface and a write port interface of the at least one buffer memory to a corresponding coprocessor from the plurality of coprocessors, wherein switching of the input/output switches is controlled via the software implementation of the processor.

3. The video decoding system as set forth in claim 2, wherein an input/output switch from the plurality of input/output switches is connected to the write port interface of the at least one buffer memory, and data from the corresponding coprocessor is written to the buffer memory through the write port interface when the software implementation of the processor controls the input/output switch to be switched to an on state.

4. The video decoding system as set forth in claim 2, wherein an input/output switch from the plurality of input/output switches is connected to the read port interface of the at least one buffer memory, and data from buffer memory is sent to the corresponding coprocessor to be read through the read port interface when the software of the processor controls the input/output switch to be switched to an on state.

5. The video decoding system as set forth in claim 1, wherein the plurality of coprocessors share the at least one buffer memory.

6. The video decoding system as set forth in claim 1, wherein, the plurality of coprocessors are connected to form a common bus structure, and each of an input and output data interface of the plurality of coprocessors corresponds to a read port interface and a write port interface of the at least one buffer memory respectively, such that the at least one buffer memory is distinguishable from the plurality of coprocessors.

7. The video decoding system as set forth in claim 6, wherein, a zero signal line is further arranged in the common bus structure to be accessible by the at least one buffer memory, the processor controls one input/output switch to allow the read port interface of the at least one buffer memory to access the zero signal line when data is not to be read from the at least one buffer memory, and the processor controls another input/output switch to allow the write port interface of the at least one buffer memory to access the zero signal line when data is not to be written into the at least one buffer memory.

8. The video decoding system as set forth in claim 1, wherein, the buffer memory is a 2-port SRAM (Static Random Access Memory) for storing data to be processed by the plurality of coprocessors or data pre-processed by the plurality of coprocessors.

9. The video decoding system as set forth in claim 1, wherein, the plurality of coprocessors are partitioned into hardware blocks for performing at least de-blocking filtering, intra prediction, inter prediction and residual image decoding.

10. The video decoding system as set forth in claim 2, wherein, the processor performs a data loading process, an intra prediction process and a resulting data storage process, wherein, in said data loading process, the processor loads a reference data required for the intra prediction from the external memory, and stores the loaded reference data in the buffer memory, wherein the processor connects the DMA coprocessor and the buffer memory by controlling the switching of the input/output switch via the bus using the software implementation of a processor, wherein the DMA coprocessor reads the reference data from the external memory, and the buffer memory stores the read reference data;

in said intra prediction process, the processor reads a residual image data and the reference image data from the external memory, performs the intra prediction in a coprocessor from the plurality of coprocessors, and stores a resulting intra predicted data in the buffer memory, wherein the processor connects a first buffer memory in which the residual image data is stored, a second buffer memory in which the reference image data is stored, the coprocessor for performing the intra prediction, and a third buffer memory in which the intra predicted data is stored, by controlling the switching of the input/output switch via the bus using the software implementation of a processor; and in said resulting data storage process, the processor loads the intra predicted data from the buffer memory, and stores the loaded data in the external memory, wherein the processor connects the third buffer memory in which the intra predicted data is stored and the DMA coprocessor which stores the intra predicted data in the external memory, by controlling the switching of the input/output switch via the bus using the software implementation of a processor.

11. The video decoding system as set forth in claim 10, wherein, while a corresponding operation in each process is performed in respective coprocessors, operations of remaining coprocessors are controlled via the software implementation of the processor, or other software operations are performed.

12. A video decoding system for decoding a compression-coded video signal, the video decoding system comprising:

at least one buffer memory for storing reference image data and residual image data required for an intra prediction process used during decoding of the compression-coded video signal, wherein the residual image data is stored in a first buffer memory of the at least one buffer memory and the reference image data is stored in a second buffer memory of the at least one buffer memory;

a plurality of coprocessors partitioned into hardware blocks for performing at least de-blocking filtering and the intra prediction process, wherein the reference image data and the residual image data are used to produce a resulting intra predicted data that is stored in the at least one buffer memory;

a plurality of input/output switches for connecting the at least one buffer memory and a coprocessor among the plurality of coprocessors, which are connected to a read port interface and a write port interface of the at least one buffer memory; and a DMA (Direct Memory Access) coprocessor for performing a direct access operation to an external memory to load the reference image data from the external memory, and to store the reference image data in the at least one buffer memory, wherein, the at least one buffer memory, the plurality of coprocessors, the plurality of input/output switches and the DMA coprocessor take the form of hardware, and wherein, operation control of the plurality of coprocessors to perform the intra prediction process using the reference image data and the residual image data, the DMA coprocessor to load the reference image data from the external memory and to store the reference image data in the at least one buffer memory, and switching control of the plurality of input/output switches for data input/output from/to the at least one buffer memory are performed via a software implementation of a processor, wherein the processor transmits the operation and switching controls to a processor interface through a processor interface bus.

13. The video decoding system as set forth in claim 12, wherein the plurality of coprocessors share the at least one buffer memory.

14. The video decoding system as set forth in claim 13, wherein, the plurality of coprocessors are connected to form a common bus structure, and each of an input/output data interface of the plurality of coprocessors corresponds to a read/write interface of the buffer memories, such that the buffer memories are distinguishable from the plurality of coprocessors.

15. The video decoding system as set forth in claim 14, wherein, a zero signal line is further arranged in the common bus structure to be accessible by the at least one buffer memory, and wherein the processor controls one input/output switch from the plurality of input/output switches to allow the read port interface of the at least one buffer memory to access the zero signal line when data is not to be read from the at least one buffer memory, and the processor controls another input/output switch from the plurality of input/output switches to allow the write port interface of the at least one buffer memory to access the zero signal line when data is not to be written into the at least one buffer memory.

16. The video decoding system as set forth in claim 12, wherein, the buffer memory is a 2-port SRAM for storing data to be processed by the plurality of coprocessors or data pre-processed by the plurality of coprocessors.

* * * * *